Oct. 8, 1963   E. G. ANDERAU   3,106,506
TAG AND METHOD AND APPARATUS FOR ITS PRODUCTION
Filed Aug. 15, 1958   6 Sheets-Sheet 1

INVENTOR
EMIL ANDERAU
BY
ATTORNEY

Oct. 8, 1963  E. G. ANDERAU  3,106,506
TAG AND METHOD AND APPARATUS FOR ITS PRODUCTION
Filed Aug. 15, 1958  6 Sheets-Sheet 2

INVENTOR
EMIL ANDERAU

BY
ATTORNEY

Oct. 8, 1963

E. G. ANDERAU 3,106,506

TAG AND METHOD AND APPARATUS FOR ITS PRODUCTION

Filed Aug. 15, 1958

INVENTOR
EMIL ANDERAU
BY
ATTORNEY

Oct. 8, 1963   E. G. ANDERAU   3,106,506
TAG AND METHOD AND APPARATUS FOR ITS PRODUCTION
Filed Aug. 15, 1958   6 Sheets-Sheet 5

INVENTOR
EMIL ANDERAU
BY
ATTORNEY

Oct. 8, 1963   E. G. ANDERAU   3,106,506
TAG AND METHOD AND APPARATUS FOR ITS PRODUCTION
Filed Aug. 15, 1958   6 Sheets-Sheet 6

INVENTOR
EMIL ANDERAU
BY
ATTORNEY

United States Patent Office 3,106,506
Patented Oct. 8, 1963

3,106,506
TAG AND METHOD AND APPARATUS FOR ITS PRODUCTION
Emil G. Anderau, Yonkers, N.Y., assignor to Ti-All Fasteners, Inc., Tuckahoe, N.Y.
Filed Aug. 15, 1958, Ser. No. 755,278
20 Claims. (Cl. 156—519)

The present invention relates to a tag unit of general utility for attachment to objects of all types for identification thereof and to the method and apparatus for producing the tag units.

Heretofore, various types of tags have been used including tags having eyelets with a strand of wire or cord passed therethrough for securement of the tag to an object. Although the eyelet type tag has served a useful purpose, the cost of production and the expense in using the same including the labor involved in the application of such tags to an object has been a burden on the trade with resulting cost to the consumer; also these eyelet tags would not be retained in a display position, requiring an observer to handle the tags to observe the material thereon.

The apparatus for making eyelet tags of the previously known types have limited production speeds and large numbers of machines have been required to produce tags in sufficient quantities to meet the current demand. The prior machines have had excessive vibration because of the reciprocating movements of the parts resulting in objectional noise, wear and tear on the machines and strain on the operator. With machines according to the present invention, manufacturing costs, including equipment, maintenance, power requirements and the labor involved in the making of eyelet tags are less than those of previously known machines.

An object of the invention is to provide a tag unit including a composite strip with a flag extending outwardly therefrom and with a strand of sufficient stiffness to secure the tag unit to an object in a definite position for display.

Another object of the invention is to overcome the difficulties encountered in the prior art machines and to provide a machine which is efficient, easy to operate, and relatively inexpensive to build.

A further object is to provide a machine which continuously produces tags by uni-directional movement of the parts of the machine and material resulting in low cost operation for long periods of time.

Another object is to provide a method of assembling the parts of a tag unit for high speed production.

Another object of the invention is to provide a method of making a composite tag with an attaching strip of relatively stiff deformable material in a continuous operation in which the materials are not subject to objectionable acceleration forces thereby permitting the use of relatively inexpensive materials of little strength and low cost.

A further object is to provide a method of continuously producing tag units and securing the parts of the tag unit together by a high speed heat sealing process under controlled conditions to maintain a uniform high quality product.

Another object is to provide a machine for making tag units in which the flag can be attached to a tape or strap in a definite position and in which the machine is adjustable to vary the length of the attaching strip, the size of the flag and the position of the flag on the attaching tape or strip.

A further object is to provide apparatus and method for making deformable strips for attachment to articles or for securing articles together.

Another object is to provide a machine and method for producing tags and strip attaching means therefor in a machine and by a method which results in high efficiency.

A still further object is to provide a finished attaching structure for tags and the like which can be applied by relatively unskilled persons.

Other and further objects of the invention will be apparent as the description proceeds and upon reference to the accompanying drawings wherein.

Briefly stated, the present invention includes a tag unit having a deformable tape covered wire strip for attachment to an object and the machine and method for making the same. The tag unit is made from a web of flag material fed over a printing roller to provide information thereon, to a first pair of feed rollers, then to a flag cutter which partially severs the flag from the supply leaving two unsevered portions or bridges between the leading flag and the flag supply web. From such flag cutter the partially severed flag is fed to a second pair of web feed rollers. The two pairs of feed rollers and the flag cutter operate at a low peripheral speed. From the second pair of feed rollers the leading unsevered flag is delivered to a higher peripheral speed segmental and heated roller feed which pulls the leading flag from the next adjacent following flag held by the second pair of low speed feeding rollers. A first tape having a thermoplastic material on one surface is guided with its other surface over the heated feed roller and fed into contact with the leading flag as the leading flag is severed by the tension in the bridges resulting from simultaneous contact of the leading and following flags with the high speed segmental and heated feed rollers and the second pair of low speed feed rollers thereby breaking the bridges between the leading flag and the next adjacent flag. The flag and first tape are partly secured together by the heat and pressure of the segmental and heated rollers and then fed to a first pair of composite strip heated feed rollers.

The present machine makes two tag units simultaneously and the composite strip of flags, tapes and wires are later slit leaving two or more bridges to form the two tag units. A pair of wires are fed from wire supplies provided with flyer dewinders through a wire straightening arrangement of rollers, to a pair of wire feed rollers past a wire guide roller to a first pair of heated rollers and into contact with the thermo-plastic coated surface of the first tape and the exposed surface of the flag thereon, the wires being spaced apart within the width of the thermo-plastic tape so that each wire is ultimately attached to each tag unit.

A second tape coated with a thermo-plastic adhesive on one surface is fed with its other surface around a portion of a roller of the first pair of heated rollers into contact with the wires, the first tape, and flags thereby providing a composite strip of the first and second thermo-plastic strips, the wires, and the flag. Such composite strip is then fed to successive pairs of heated rollers until the thermo-plastic is adequately secured to the tapes, the wires, and flags thereby providing an integral unit. A pair of composite strip feeding rollers are provided on the discharge side of the last pair of heated rollers and a slitter cutter having a notch in its periphery is provided thereafter to slit the composite strip between the wires leaving two or more bridges between each pair of tag units. From the slitter the bridge connected composite tag units are fed to a cutter which cuts off the pair of tag units from the composite strip and the tag units are stacked in pairs by means of suitable guides such as rods or the like. The pairs of feed rollers are arranged in a manner that one roller of each pair may be separated from its cooperating feed roller. One heated roll of each pair is adapted to be simultaneously separated from its cooperating roll against the tension of the springs urging them together. The pairs of heated rollers are provided with wire receiving grooves and are also provided with ridge forming grooves which provide a plurality of ridges in the tape sections of the composite strip of the finished tag unit and assist in obtaining intimate contact between the thermo-plastic materials of the two tapes. In the machine, the feed of the flag units and the length thereof are adjustable and the length of the strap portions of each tag unit is adjustable by the proper section of the speed of feed of the flag units to the speed of feed of the wire and tape strap portions to obtain a ratio $l/L$ where $l$ is the length of the flag unit and $L$ is the length of the strap portion of the tag unit as shown in FIG. 1.

Figures 1, 2, 3, 8, 9:
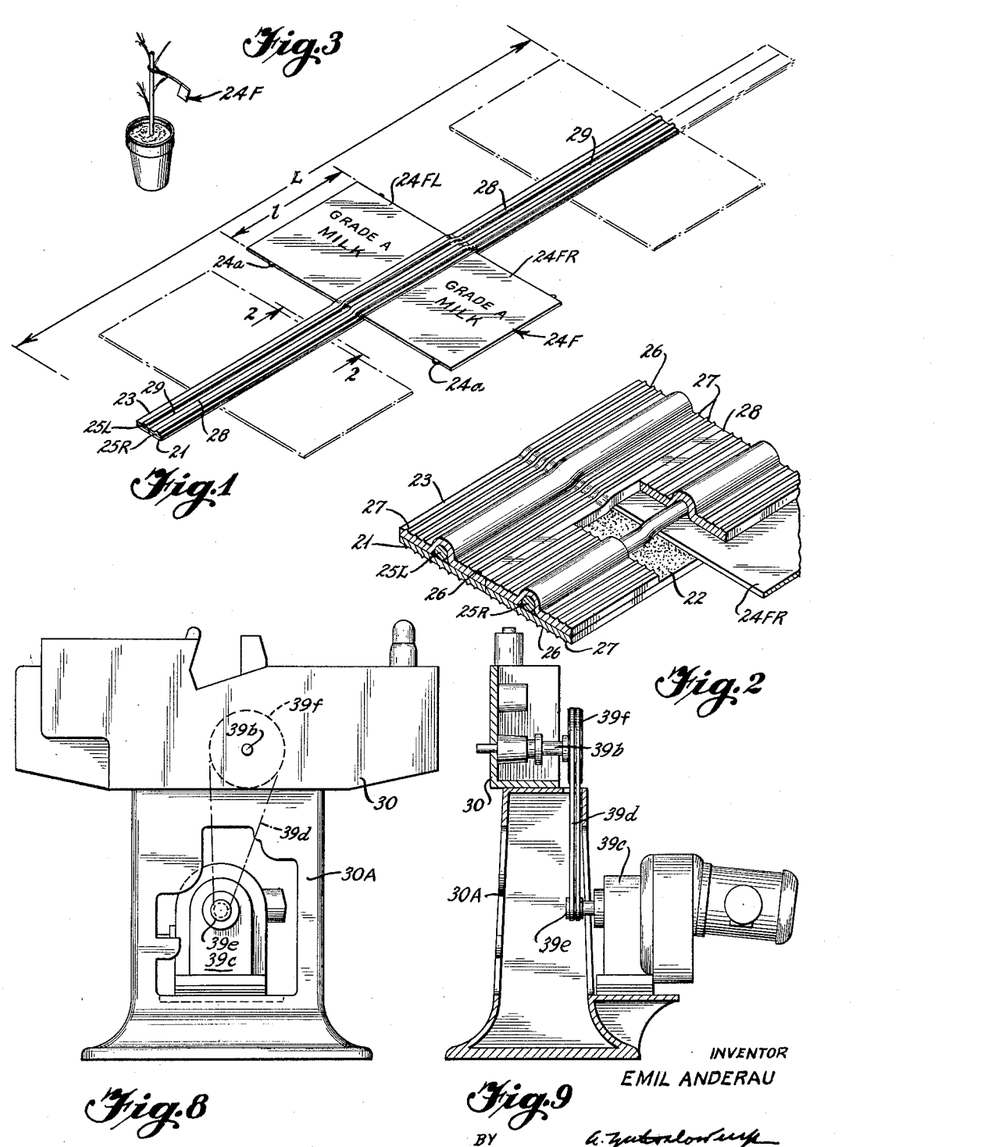
FIG. 1 is a perspective view of a pair of finished tag units completed upon the present machine and by the present method showing connecting unsevered bridges between the individual tag units and illustrating in phantom outline various positions of the flag.
FIG. 2, an enlarged fragmentary perspective and section taken substantially on line 2—2 of FIG. 1 with parts broken away showing the arrangement of tapes, wires and flags, and the thickness or vertical scale being increased disproportionately to show the ridges on the tape.
FIG. 3, an illustration of the use of the tag unit on an article.
FIG. 8, a front elevation of the machine frame and its standard showing driving motor and main driving shaft.
FIG. 9, an end view of the discharge end of the machine frame and standard shown in FIG. 8 showing the motor drive and the main drive shaft.

Referring more particularly to the drawing, a pair of tag units are shown in FIG. 1 to include a first tape 21 having thermo-plastic coating 22 on one surface and a second tape 23 having a thermo-plastic coating 22 on its surface adjacent tape 21 while between such tapes a flag 24F is positioned being secured to the tapes by the thermo-plastic adhesive 22. Also secured between the tape 21 and the flag 24, and tape 23 are wires 25L and 25R, the tapes, wires, and flag, being maintained in assembled relation by the thermo-plastic adhesive 22; the tapes 21 and 23 are provided with ridges 27 and flat valleys 26 which assure bonding of the tapes 21, 23 by the thermo-plastic adhesive. An interrupted slit line 28 extends the length of the tag units leaving unslit portions or bridges 29 in two or more spaced positions along the length of the tag units, such bridges being readily separated by a user of the tag to permit use of a single tag unit. The flags 24F have tabs 24A which are the remains of bridges formed in the partial severing of the flags from the strip of web material.

It will be noted that the flag 24F may be positioned in various locations along the composite strip formed by the wires and tape and that the composite strip secured to the flag may be longer as shown in dotted lines or shorter to meet the needs of the user.

In FIG. 3 a tag unit with the flag 24F at one end is applied to a potted plant. It will be evident that the flag 24F may be in the center as shown in FIG. 1 and applied to an object by twisting the ends of the composite strip together.

Referring to FIGS. 4 to 9 a main frame 30 is supported on a sub-frame 30A and a supply of flag web material 24 is provided in a roll with suitable means to mount such roll for feeding past a first web guide bar 31, over a platen printing roller 32, thence around a printing registering guide roller 33, thence to a first pair of web feed rollers 34, 35, to a flag cutting roller 36 and its cooperating anvil roller 37, which partially sever the leading flags from the web leaving connecting bridges 24A. The leading flag 24F is then fed from the flag cutting rollers to a second pair of web feed rollers 34, 35 operating at the same peripheral speed as the speed of the web. The feeding speed of the web flag material 24 is substantially constant through the path just described and the feeding speed of the web and the peripheral speed of the rollers are substantially the same, being a definite speed based on the length $l$ of the flag with respect to the length L of the composite strip on the finished tag units. One or more printing rollers 38, 39 cooperating with platen roller 32 may be provided for engaging the web of flag material 24 to print indicia thereon for the purpose for which the tag unit is intended. The rollers 32 to 39 inclusive are positively driven from a first auxiliary power shaft 39a which is positively driven from the main power shaft 39b which is driven by an infinitely variable speed electric motor 39c with suitable controls the motor 39c driving main drive shaft 39b through V-belts 39d and pulleys 39e and 39f.

Figures 4, 13, 14:
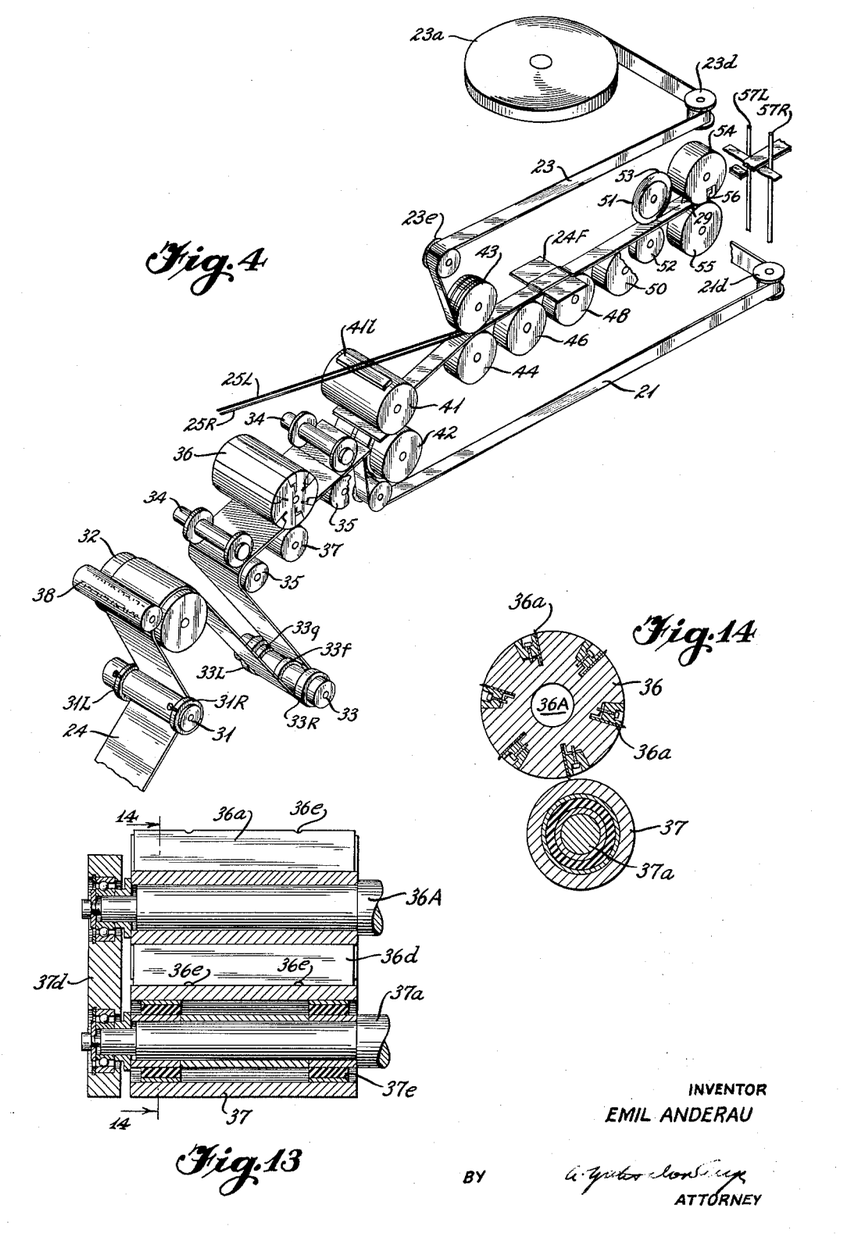
FIG. 4, a diagrammatic perspective view of the flow of material through the machine with a number of the rollers and other parts omitted illustrating the manner in which the strips of thermo-plastic tape, the web flag material and the wires are fed through the machine, assembled, connected together, severed, fed out of the machine and stacked in a continuous manner.
FIG. 13, a section through the flag cutoff roller and its cooperating anvil roller.
FIG. 14, a vertical transverse section through the flag web cutoff and anvil rollers taken substantially on line 14—14 of FIG. 13.

From the second pair of web feed rollers 34, 35, the leading flag unit 24F which has been partially severed by flag cutter rollers 36, 37 passes between a segmental roller 41 and a first heated feed roller 42 which operate at a higher peripheral speed than rollers 32 to 37 inclusive, in the ratio of $l/L$ breaking connecting bridges 24a, 24a between leading flag 24F from the web 24 and thereby freeing leading flag 24F from web 24. The first tape 21 passes with its uncoated surface against the heated roller 42 with its thermo-plastic covered surface 22 extending outwardly and into contact with the leading flag unit 24F and when the pressure plate or pressure area 41e of the segmental roller 41 engages the flag 24F, the flag is pressed into intimate contact with the heated thermoplastic adhesive tape against heated roller 42 causing the flag to be retained on the tape. The tape 21 with the flag 24F thereon is then fed forwardly to a first pair of heated rollers 43, 44 and thence to other pairs of heated rollers 45, 46 and 47, 48 thence to a pair of composite strip feed rollers 49, 50.

It will be evident that the material for the tags and the material for the strips may be fed intermittently from a continuous supply or from stacks of pre-cut material with resulting intermittent operation of the printing and/or the heating pressure units, such heating pressure units may be plates such as pressure plates or may be intermittently operated pressing plates which are intermittently brought together as the product stops or passes under the pressure plates.

It will be apparent that the tag units may be formed from pre-cut flags and/or pre-cut strips and such flags or strips may be printed prior to the assembling or simultaneously therewith or the flags and strips may be supplied from rolls and the material may be intermittently fed and the printing and other operations may be intermittently in part or intermittent throughout the entire series of operations thereby producing a finished composite article.

The wires 25L and 25R are fed from fixed spools 25La and 25Ra mounted on a suitable support having spindles 25Lb and 25Rb extending upwardly therefrom and rotatably supporting flyer dewinder arms 25Lc, 25Rc having eyes at each end through which the wires are fed and such arms rotate as the wire is drawn substantially axially from the stationary spool, such wires being fed over suitable guide rollers 25Ld, 25Rd respectively to a wire straightener 25e and thence to the pair of wire feed rollers 25f, 25g and to a wire guide roller 25h and thence to the first pair of heated rollers 43, 44. The second tape 23 having a thermo-plastic coating 22 on one surface is fed with its uncoated surface against the heated roller 43 of the first pair of heated rollers so that a substantial portion of the tape extends around the periphery of the roller 43 so the cold tape and thermo-plastic material are effectively heated. Tape 23 is applied with pressure by suitable springs acting on the rollers 43 to press the tape 23 into contact with the wires 25L, 25R, the first tape 21 and the flag 24F. The composite strip is fed through the passes formed by heated rollers 45, 46 and 47, 48 thereby effectively securing the composite strips together.

From the final pair of heated rollers, the composite strip passes between the pair of composite strip feed rollers 49, 50.

A slitter roller cutter 51 cooperating with an anvil roller 52 serves to slit the composite strip along the length thereof leaving uncut bridges 29 between such severed sections of the composite strip, such bridges being formed by one or more notches 53 in the periphery of the slitter roller 51 which results in the uncut bridge portions 29 of the composite strip. A cut off roller 54 having a cut off blade 56 cooperates with a hardened anvil roller 55 to cut off individual tag units from the composite strip and at least one of such rollers 54 or 55 is adjustable horizontally and/or vertically to provide for a straightening action of the composite strip to correct for the tendency of the wires 25L or 25R to curl toward or away from one of the rollers. The adjustment provides for controlling the pass between the rollers 54 and 55 to cause bending of sufficient magnitude in the composite strip in the correct direction to form the straight completed pair of tag units and such tag units are fed outwardly from the rollers 54 and 55 to abut suitable guide stops or posts 57L, 57R which may be engaged by the flag section 24FL, 24FR respectively thereby producing a neat stack or pile. Any quantity of pairs of tag units may be removed from the bottom of the pile for packaging in any suitable manner.

Figures 5, 6:
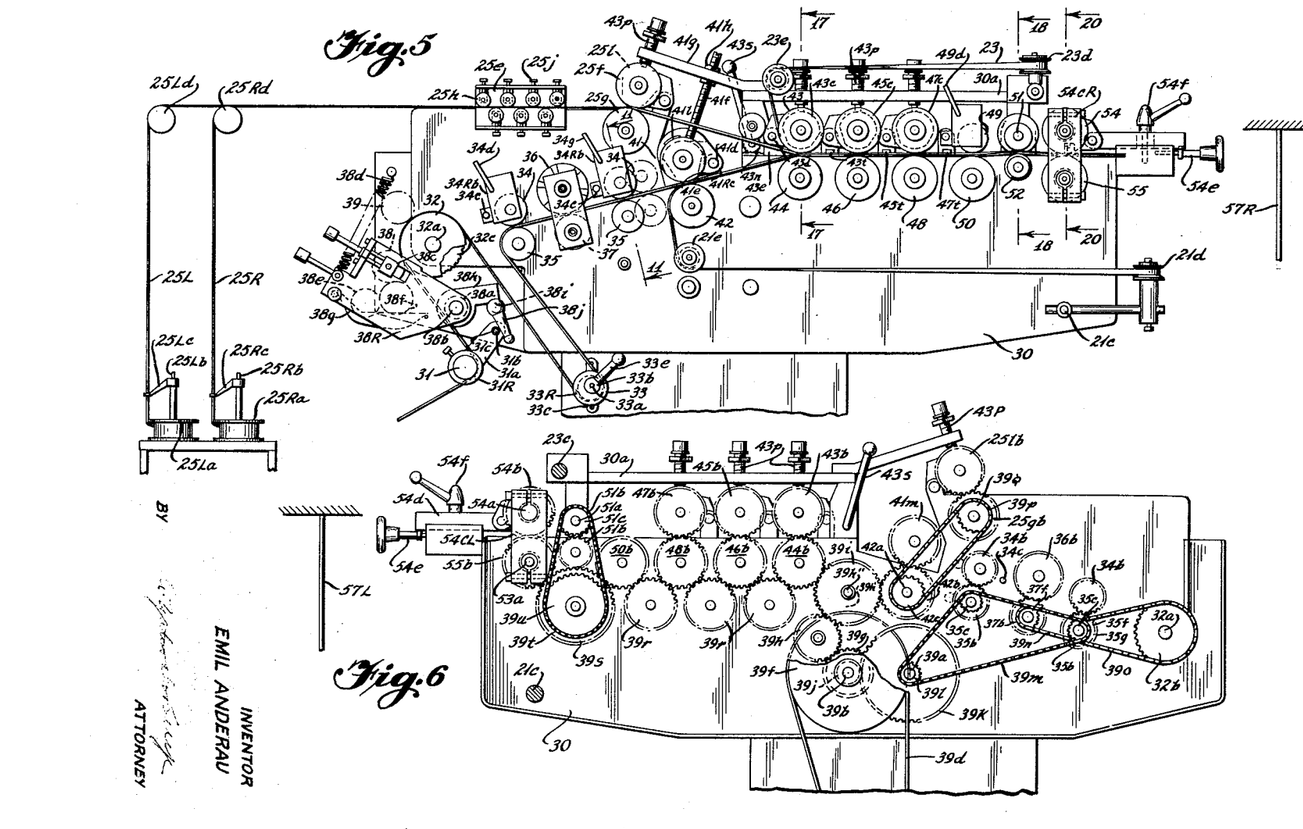
FIG. 5, a front elevation of the machine.
FIG. 6, a rear elevation of the machine showing the gear drive and chain drive.
Figure 7:
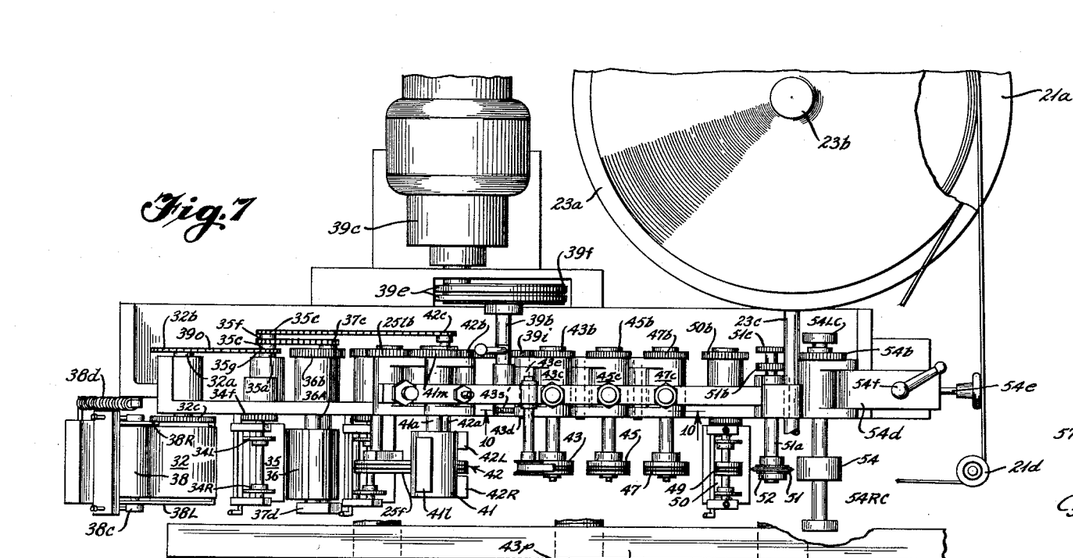
FIG. 7, a top plan view of the machine with some of the roller gears omitted.

The wire feed rollers 25f, 25g, the segmental roller 40 and its cooperating heated roller 41, heated pairs of rollers 43–48 inclusive, the pair of composite strip feed rollers 49, 50, slitter rollers 51, 52 and cut off rollers 54, 55 are driven at substantially the same peripheral speed which is higher than the peripheral speed of the rollers 32 to 39 inclusive, in the approximate ratio of $L/l$. The peripheral speed of heated rollers 43 to 48 inclusive is progressively increasing toward the discharge end by a slight increase in the diameter of the pairs of heated rollers 45, 46 and 47, 48 to maintain the composite strip material in a smooth unlooped condition. The slitter roller is also driven at a slightly higher peripheral speed by a slight enlargement in diameter but the speed of the slitter roller is insufficient to break the bridges 29 formed by the notches 53 in the slitter roller. The wire feed rollers, heated rollers, segmental roller 41, composite strip feed rollers, slitter roller, and the composite strip cut off rollers are positively driven from a second auxiliary source of power from main shaft 39b through replaceable gear 39g on the main shaft and idler gear 39h, 39i mounted on link 39h' pivoted on the stub shaft 39h'' of gear 39i which gears are positively driven from the main source of power so the lower speed, printing, web feed, and cut off rollers 32 to 39 inclusive are driven in timed relation to the rollers 41 to 55 inclusive. The drives are positive from the main source thereby producing a constant interrelation in which the length, $l$, of the flag 24F with respect to the length, $L$, of the composite strip provides a ratio:

$$\frac{\text{Peripheral speed of web}}{\text{Peripheral speed of composite strip}} = \frac{l}{L}$$

The structures of the machine subsequently to be described bring out how this relation is accomplished by the use of gears, sprockets, and chains which may be of conventional construction. The adjustments are shown as being accomplished by replacement of certain gears i.e. gear 39g for other gears of different diameter and by replacement of certain sprockets for other sprockets and by replacement of one size roller for another.

The segmental roller 41 may be of suitable size, two additional larger sizes being shown in dotted lines at 40a, 40b when a greater length $l$ of flag 24F is desired. Six cutter blades 36a are shown on cutter roller 36. When the length $l$ of the flag 24F is to be doubled, three cutters (each alternate cutter) are removed leaving only three cutters. If the length of the tag is to be tripled diametrically opposed cutters 36a are retained and the other cutters are removed. The speed of the cutter roller 36, feed rollers 34, 35, and printing roller is increased in the same proportion as the increase in length of the flags.

Similarly, the length of the composite strip cutoff may be varied by the substitution of a different size of composite strip cut off roller 54 such as one of greater diameter, 54a, it being apparent that the peripheral speed of the cutoff roller is substantially that of the heated rollers, segmental roller, wire feed rollers, and composite strip feed rollers, all of which would be driven at the same higher peripheral speed with respect to the web feed to obtain the desired ratio $l/L$.

*Printing Device*

In addition to printing roller 38, the printing device includes side frame members 38L, 38R which are fixed to a sleeve 38a which is pivotally mounted on a flanged pivot pin 38b which is fixed by its flange to the main frame 30, the printing frame members 38L and 38R rotatably supporting the printing roller 38 on the screw adjustable slides 38c. The frame is urged by spring 38d so that roller 38 will contact a portion of web 24 on platen roller 32, suitable doctor rollers 38e, 38f being provided to extend into an ink reservoir 38g carried by the printing frame. An arm 38h which may be integral with the plate 38L engages a cam surface 38i on an adjusting shaft operated by a handle 38j whereby the cam surface 38i will move the printing frame against the tension of spring 38d so that the roller 38 will not contact the web and will not print when it is desired to have the flags unprinted or for threading the web through the machine. A similar arrangement may be provided for printing roller 39 so that two color printing can be had. If desired other printing rollers may be added for additional colors.

The guide bar 31 is mounted on an arm 31a which is pivotally connected to the main frame 30 by a laterally extending bolt 31b passing through the arm 31a, through a sleeve 31c surrounding the bolt and fixed to the arm 31a by welding or the like, the bolt being secured in position by a nut 31d. The guide bar 31 is fixed to the arm 31a by a bolt 31b and a cooperating nut. Suitable adjustable guide collars 31L and 31R are provided to guide the flag web 24 in proper relation to the platen roller 32 which is mounted in suitable bearings by means of a shaft 32a passing through a boss in the frame 30 and carrying a sprocket 32b on its opposite end, a gear 32c being secured to the platen roller for positively driving the printing roller 38 to obtain proper peripheral speed for registration of the printing.

A loop is provided in the web material 24 by the guide roller 33 between the platen roller 32 and the first pair of web feed rollers 34, 35, such guide roller 33 being rotatably mounted on a shaft 33a eccentrically fixed to shaft mounting portion 33b which is frictionally retained in a flanged bushing sleeve 33c by means of a bolt 33d or the like threaded into the shaft portion 33b and the head of such bolt reacting against a spring and washer combination which engages an end of the flanged bushing sleeve 33c. A handle 33e is fixed on the free end of shaft 33a by any suitable means, the roller 33 being held in accurate relation against axial movement by a collar engaging the outer end of the roller 33, the inner end of the roller being guided by a shoulder on the crank disk. Printed web guiding collars 33R, 33L are provided adjacent opposite ends of the rollers and are adjusted by thumb screws, such collars being provided with a portion of reduced diameter 33g and the roller 33 having a central portion 33f of the same diameter but of enlarged diameter to the rest of the roller so that the printed portion of the web will lie between the reduced diameter portions of the collars and the enlarged portion 33f of the roller 33 so as to avoid contacting freshly printed surfaces to avoid smearing of the printing on the web.

Web Feed Rollers

Figure 11:
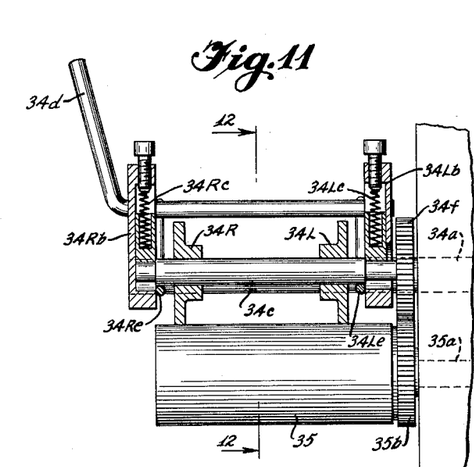
FIG. 11, an elevational view with parts in section of the first and second pairs of feed rollers.
Figure 12:
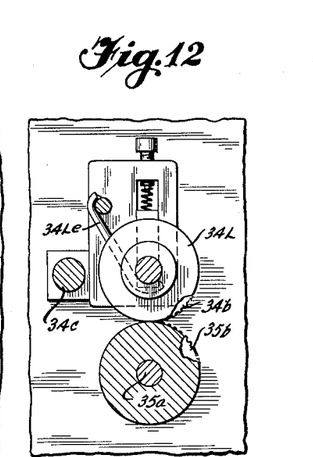
FIG. 12, an end elevation of the pair of feed rollers.

Both pairs of web feed rollers 34, 35 are substantially identical and a description of the second pair 34, 35 between web cutter roller 36 and segmental roller 41 will be give in detail.

Roller 35 is provided with a laterally extending shaft 35a rotatably mounted in suitable bearings in frame 30 which shaft carries a gear 35b. A sprocket 35c, fixed to the inner end of shaft 35a, serves to drive the feed roller 35. The roller 34 includes two disks 34R, 34L which are adjustably fixed or secured to a shaft 34a which is mounted for rotation in frame members 34Rb, 34Lb which are secured to a mounting bar 34c which is selectively mounted in one of several bores in the main frame 30 and extends outwardly being bolted to the frame members 34Rb and 34Lb by suitable bolts. The shaft 34a is urged toward roller 34 by springs 34Rc, 34Lc which are adjustable by screws engaging the springs. To separate the roller disks 34R, 34L from the roller 35 to permit threading of the web and to prevent feeding of the web a hand lever 34d operates a shaft which carries J-shaped cam members 34Re, 34Le which engage the shaft 34a with a cam action. The disk roller elements 34R and 34L are axially adjustable on the shaft 34a to accommodate for different widths of web flag material so that the contact of the disk with the web will be outside of the printed area to avoid smearing of the printing. The shaft 34a is driven by a gear 34f which meshes with gear 35b thereby providing positive driving of the shaft 34a and the feeding disks. The position of the pair of rollers 34, 35 may be changed from the full line position to the dotted line position by the mounting of the shaft 35a in a different bore in frame 30 and correspondingly mounting bar 34c in a different bearing in frame 30 for supporting the roller disk 34R, 34L in proper cooperative position. The reason for the adjustment of the location of the second pair of feed rollers 34 and 35 is to accommodate different lengths of flags since the spacing of the second pair of feed rollers 34, 35 to the adjacent segmental roller 41 and heated roller 42 should be less than twice the length of a flag and should not be less than the length of a flag to assure that weakened areas 24a between partially severed flags 24F are located between the second pair of feed rollers 34, 35 and the segmental roller 40 and its cooperating heated roller 42 and that two weakened areas cannot simultaneously be located between the second pair of feed rollers 34, 35 and segmental and heated rollers 41 and 42 and the two adjusted positions noted will normally take care of the usual range of length of the flags 24F. It will be observed that the first pair of feed rollers 34, 35 are substantially identical and therefore there is no need for detailed description thereof, similar parts being identified with similar reference numerals.

Flag Web Cutter Roller

The flag web cutter roller 36 is mounted on a shaft 36a which is rotatably mounted in the main frame 30 and carries a gear 36b by which the cutter is driven. The cutter roller 36 carries a plurality of cutter blades 36a and each cutter blade is provided with notches 36e, 36e which form the bridges 24A, 24A which connect the partially severed flags.

The anvil roller 37 is rotatably mounted on a shaft 37a which is rotatably mounted in suitable bearings in the frame 30 and has a drive gear 37b fixed thereon which drives gear 36b of the cutter roller. The anvil roller 37 is supported by means of resilient rubber like rings 37e which in turn are supported on the shaft 37a, the resilient rings or bands 37e providing for yieldable contact of the cutter blade 36a with the anvil roller to assure accurate cutting without damage to the blades.

The shaft 37a is driven by a sprocket 37c fixed to the shaft and through gear 37b drives shaft 36A. To maintain the outer ends of the shaft 36A and 37a in accurate parallel relation, a brace 37d is provided with suitable bearings with the spacing of such bearings accurately corresponding to the spacing of the bearings of the shafts 36A and 37a thereby maintaining the correct alignment and assuring that an accurate cutting action is obtained. It will be apparent that the cutter blades 36a will be adjustable to obtain the accurate parallel relation and to compensate for the wear on the knife edges of the cutters.

Segmental Feed Roller and Cooperating Heated Roller

Figure 15:
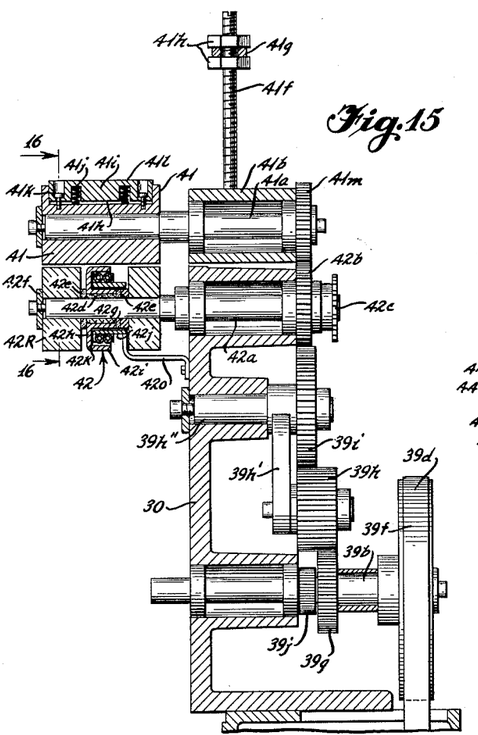
FIG. 15, a generally vertical section through the machine taken through the axis of the segmental feed roller and its cooperating heated roller and showing the drive mechanism therefor.
Figure 16:
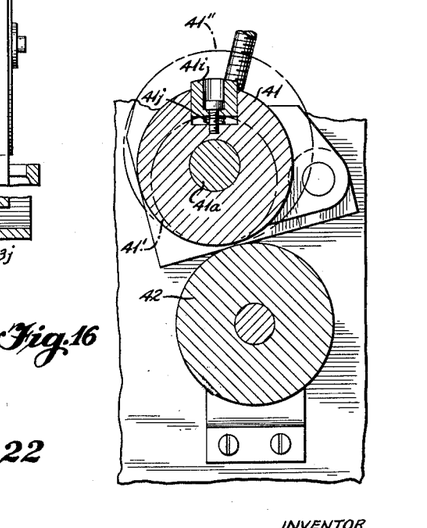
FIG. 16, an enlarged sectional view of the segmental roller and cooperating heated roller and roller elements taken substantially on line 16—16 of FIG. 15.

The first heated feed roller 42 is supported on a reduced section of a shaft 42a, the larger diameter section of the shaft being rotatably supported in suitable bearings in the main frame 30 and such shaft carries a gear 42b and a sprocket 42c suitably keyed to the shaft. The heated roller 42 includes unheated sections 42L, 42R between which unheated section, a heated hollow roller of channel shaped section is fixed to shaft 42a by means of insulating material including insulating sleeve 42d and insulating washers 42e, the unheated rollers and the heated roller being retained by washer 42f secured to the reduced section of the shaft by a cap screw or the like against washer 42f against the outer roller 42R.

The heated feed roller 42 is of channel shape in radial section having a hub portion 42g and a web portion 42h and a rim portion 42i providing an annular space for the reception of an annular heater supporting sleeve or ring 42j. Such annular ring carries an L-shaped flange 42k at one end adjacent the web 42h and positioned against said flange 42k are "Calrod" type electrical heating elements 42l and are retained by an L-shaped flange or washer 42m and split washer 42n in grooves in sleeve 42j in fixed position to heat the rotating roller 42. The ring 42j is retained in operative position to the heated roller 42 by means of a Z-shaped bracket 42o which is fixed to the main frame by a bolt or the like and suitable electrical conduits are provided to supply electrical energy to such heating coils 42p.

The segmental roller 41 is keyed on shaft 41a which is rotatably supported in bearings in a rocker arm 41b. The rocker arm 41b is pivotally supported by means of forwardly extending arm elements 41Lc, 41Rc and a pin 41d passing through said arm elements and through a lug 41e fixed to the main frame 30; said rocker arm 41b is maintained in adjusted position by an upwardly extending bolt 41f secured to the rocker arm and adjustable with respect to an obtuse angle bracket 41g which is fixed to an upper plate or flange 30a detachably secured to the main frame 30, the bolt 41f being retained in adjusted position by nuts 41h, whereby the proper positioning of the segmental roller with respect to heated roller 42 is obtained.

The roller 41, referred to as a segmental roller is essentially a complete roller with a channel or groove 41h extending axially and radially thereof from the periphery of the roller toward the axis and such groove receives an axially movable segment 41i which is urged outwardly by springs 41j and the plate is retained by bolts 41k so that the outer surface 41l of the segment projects just beyond the surface of the segmental roller to effectively contact the flag 24 and press the flag against the thermoplastic coated surface of the tape 21. The tape 21 has been heated by roller 42 so the thermo-plastic is partially softened and the pressure of segment 41l presses flag 24F against tape 21 securing the flag to the tape and simultaneously drawing the leading flag 24F at a higher speed from the web of flag material breaking the leading flag from the web of material by rupturing the bridges 24A, 24A. It will be observed that a gear 41m is mounted on the shaft 41a and meshes with the gear 42b to assure that the segmental and first heated roller operate at the same peripheral speed.

Each Pair of Heated Rollers

Figure 17:
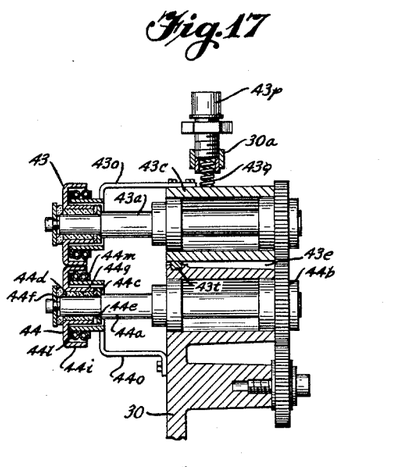
FIG. 17, a vertical section through the first pair of heated rollers taken substantially on line 17—17 of FIG. 5.

The pairs of heated rollers 43, 44 and 45, 46 and 47, 48 are substantially identical and description of rollers 43, 44 will be in detail and it will be understood that the corresponding other rollers are substantially the same.

The heated roller 44 is fixed to a shaft 44a which is rotatably mounted in suitable thrust bearings in the main frame 30 and carries a gear 44b by which it is driven. The outer end of the shaft 44a is reduced in size providing a shoulder against which a washer 44c is placed and an insulating sleeve 44d and insulating washers 44e are supported on the reduced end of the shaft and are retained in position by a washer 44f which is held in position by a cap screw or the like. The heated roller 44 is of channel shape in radial section and includes a hub portion 44g, a web portion 44h and a rim portion 44i which rim portion is of less width than the hub portion, the hub portion being retained by the insulating sleeve 44d and washers 44f and being keyed to the shaft to prevent relative rotation. Within the channel of the roller 44 an annular sleeve 44j is positioned, such sleeve carrying an L-shaped flange 44k at one end adjacent the web 44h of the roller and positioned against such web is an electrical heating element of the "Calrod" type 44l and is retained by an L-shaped annular flange 44m held in position by suitable means such as a split ring 44n in a groove in the sleeve. The sleeve is mounted in fixed position by Z-shaped bracket 44o fixed thereto and detachably secured to the main frame 30 by bolts or the like.

The upper heated roller 43 is mounted on a shaft 43a in suitable bearings which are designed to prevent endwise movement of the shaft, the shaft carrying a gear 43b by which it is driven from gear 44b. The bearings for shaft 43a are mounted in a rocker arm 43c having rearwardly extending arms 43Lc, 43Rc through which arm elements a pin 43d passes and which pin also passes through a lug 43e on the main frame 30.

The upper heated roller 43 is retained on the reduced end portion of the shaft 43a by a washer 43f and a cap screw which presses the retaining washer against the insulating sleeve and washers for supporting the channel shaped roller 43 in an insulated manner from the shaft 43a, such heated roller including the hub 43g, the web portion 43h and the rim portion 43i. Suitable heating coils 43l are supported on an annular ring 43j having an L-shaped flange 43k which engages one of the coils 43l, the other coil being retained in position by an L-shaped flange 43m which is retained in position by a split ring 43n which extends into a groove in the heater supporting sleeve 43j. The heater supporting ring 43j is mounted in fixed relation to the rocker arm 43c by an L-shaped bracket 43o which is fixed by a pair of bolts or the like to the swingable bearing support and is welded to the heater supporting ring 43j.

The upper heated roller is urged downwardly toward its cooperating lower roller for example upper heated roller 43 is urged toward lower roller 44 by means of spring devices 43p which are threaded into the plate 30a and have springs 43q which press against the swingable rocker support 43c while the adjustable cap on the device 43p provides for controlling the pressure of the spring to obtain the proper pressure between the heated rollers.

Figure 10:
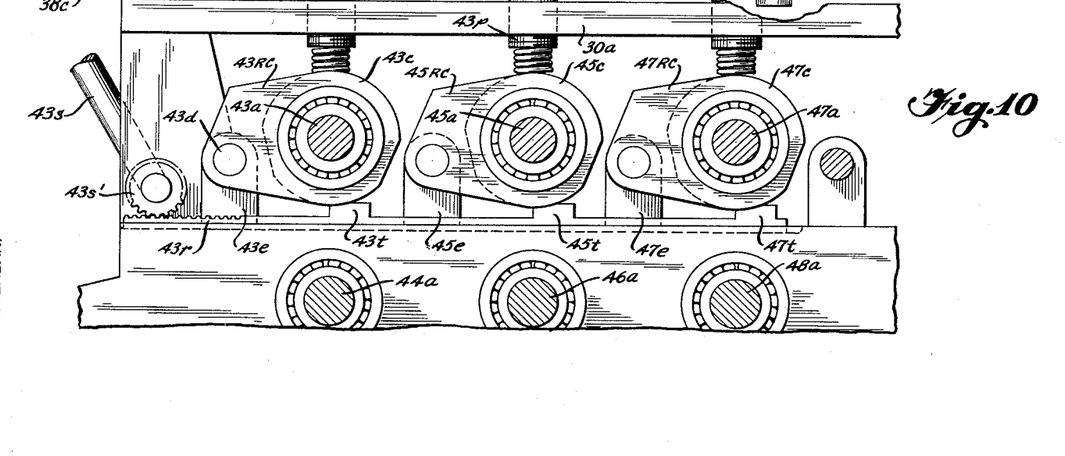
FIG. 10, an enlarged vertical section taken substantially on line 10—10 of FIG. 7 showing the rocker mounting of the upper heated rollers.

To separate the upper heated rollers a rack 43r slidably mounted in frame 30 meshes with a pinion 43s' carried by a shaft operated by a hand lever 43s whereby the rack may be moved forwardly and backwardly thereby moving cams 43t, 45t and 47t carried by the rack against the rocker supports 43c, 45c, 47c to raise the upper heated rollers to provide for ease of threading of the tapes 21 and 23 and to assist in starting.

Figure 22:
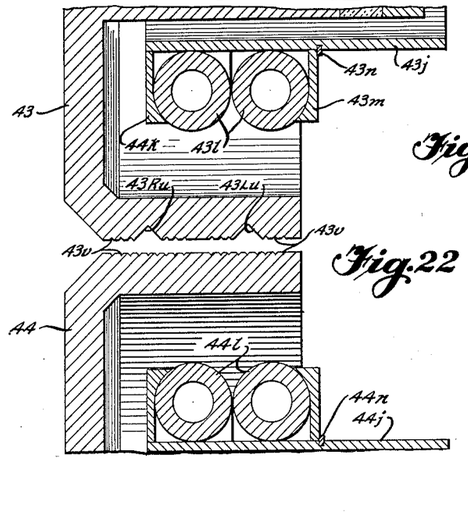
FIG. 22, an enlarged fragmentary section of the pass portion between the grooved heated rollers similar to FIG. 17 and showing the wire receiving grooves and the tape expansion grooves.

It will be noted that upper heated roller 43 is provided with wire receiving grooves 43Lu, 43Ru which receive wires 25L and 25R respectively and each roller is provided with a number of small grooves 43v which cause the formation of the ridges 27 on both surfaces of the finished composite strip.

Wire Straightener and Feed

Wire straightener 25e includes a plurality of rollers 25h mounted for transverse adjustment in a frame 25i by means of screws 25j so that a desired straightening effect may be had, each roller is preferably provided with two grooves of V-shape so that wires 25L and 25R are properly controlled during the straightening process.

Wire feed rollers 25f and 25g are mounted in a manner similar to the mounting of heated rollers 43 and 44 respectively and are urged together by a spring device 43p the upper roller 25f being mounted on a rocker 25k similar to rocker support 43c.

Feed rollers 49 and 50 are designed similar to feed rollers 34 and 35 except that the shape of the periphery of the feed rollers 49 and 50 is provided with grooves similar to rollers 43, 45 and 47 to receive the wires, the feed rollers being releasable by lever 49d.

Slitter

Anvil roller 52 (FIGS. 18, 19) is fixed to a shaft 52a rotatably mounted in bearings in the main frame 30 and is driven by a gear 52b. The slitter is supported on a shaft 51a having a gear 51b meshing with gear 52b on anvil roller shaft 52 and is driven by a sprocket 51c. The slitter roller includes a hub suitably keyed to the shaft, said hub having a flange 51d and a sleeve portion 51e.

Figure 18:
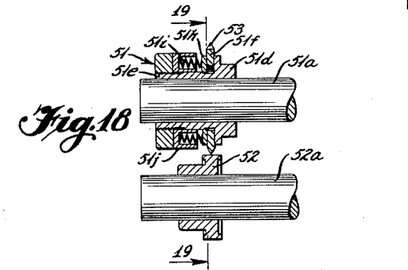
FIG. 18, a vertical section taken substantially on line 18—18 of FIG. 5 and showing the slitting roller and its cooperating roller.
Figure 19:
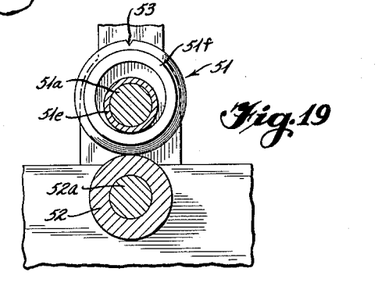
FIG. 19, a section taken substantially on line 19—19 of FIG. 18 and showing the eccentric relation of the slitting cutter with respect to its driving shaft.

An annular cutter 51f having a circular aperture of larger diameter than the sleeve portion 51e is mounted against flange 51d and in the plane of a groove 51g in the hub and is pressed against the flange by a friction washer 51h urged by springs 51i held in place and reacting against a cage 51j held in adjusted position to control the tension by nut 51k threaded on the outer end of shaft 51a.

The spacing between the centers of the shafts 51a and 52a is less than the sum of the radii of the annular cutter and the anvil roller whereby the annular cutter is continuously off center of the shaft 51a as shown so that the friction of the flange 51d and washer 51h yieldably urge the slitter 51f cutter against the anvil roller as the shafts rotate. The notch 53 in cutter 51e provides for the bridges 29 between the sections of the composite strip.

It will be noted that the anvil roller 52 has its upper portion above the upper portions of the heated rollers 44, 46, and 48 to assure a more accurate engagement with the slitter under controlled conditions. It will also be noted that the shaft 51a may be mounted in various locations to allow the use of larger diameter slitter rollers. Since the slitter roller shaft 51a is driven by a sprocket 51c it is possible to replace one size of roller with another and use gears and sprockets of appropriate size and still obtain the desired peripheral speed which is substantially the same as that of the heated rollers.

Cutoff Roller

Cutoff roller anvil 55 (FIGS. 20, 21) is mounted on shaft 55a rotatably mounted in suitable bearings in frame 30 and carries a driving gear 55b. Cutting roller 54 is mounted on a shaft 54a having a gear 54b meshing with gear 55b to maintain a proper peripheral speed relation. The shaft 54a is rotatably mounted in bearings on arms 54Lc and 54Rc which permit shaft 54a and the cutter to rock about the axis of anvil roller shaft 55a and the angular position of the arms is controlled by a slide 54d linked to arms 54Lc and 54Rc controlled by a screw 54e to cause the pass between rollers 54 and 55 to bend the end of the composite strip in the correct direction to make the resulting product straight after the pair of tag units leaves the cut off rollers. After the screw 54e is properly adjusted the locking screw 54f is tightened to retain the slide and the rocker arms 54Rc and 54Lc in fixed position.

Figure 20:
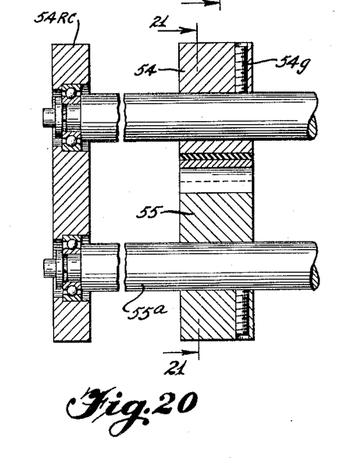
FIG. 20, a section taken substantially on line 20—20 of FIG. 5 and showing the cutoff cutter and its cooperating anvil roller.
Figure 21:
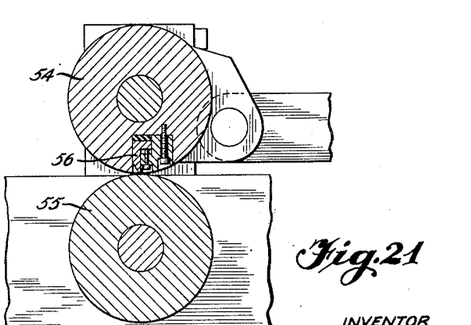
FIG. 21, a vertical section taken on line 21—21 of FIG. 20.

When it is desired to cut the composite strips off at a different length, it is only necessary to replace the cutter roller with a roller of the proper circumference and use arms 54Lc and 54Rc of proper size and the proper gear 54b on shaft 54a to obtain the correct length of the tag unit.

The cutoff blade 56 is of L-shape in section and is received in a slot in roller 54 being secured in place by a strip of resilient material in the bottom of the slot and a strip of resilient material against the angle, suitable screws being provided to secure the angle in position to position the cutting edge 56a of the blade in proper position to cut the composite strip including the wires without distruptive action on the cutting edge or on the bearings or rollers. The cutting roller 54 is angularly adjustable on the shaft by a set screw 54g or the like so that the tape can be cut off in any desired position.

The pairs of tag units are discharged from cutoff rollers 54 and 55 and against stop rods 57L and 57R and stacked, a suitable counter means being provided to indicate the number of tag units having been made by reference to a counter 57a which may be operated by the cut off shaft 54a.

Tape Supply

The lower tape 21 (FIGS. 4 to 7 inclusive) is supported on a disk 21a rotatably supported for rotation about a vertical axis by means of a hub 21b mounted on the end of a rod 21c extending through a bore in frame 30 and carrying a guide roller 21d which guides the tape 21 to another adjustable guide roller 21e below heated roller 41 to accurately guide the tape in proper relation to the rollers, the flags, the wires and the other tape 23.

The upper tape 23 is supported in a large roll on a disk 23a by means of a hub 23b rotatably mounted in suitable bearings for rotation about a vertical axis supported by a rod 23c which passes through a bore in frame 30 and is adjustably maintained therein. The other end of rod 23c carries a guide roller 23d positioned so that the tape being fed therefrom will be guided over a guide roller 21e to heated roller 43 and so that the tape 23 and tape 21 will be in registery. The guide rollers are provided with brakes which prevent looping of the tape.

It will be noted that the reels or rolls of thermoplastic tape 21, 23 are arranged on vertical axes and supported on disks which are rotatably mounted on suitable support of the main frame, the tapes being of narrow width and by being supported on the horizontal disk sudden force on the tape is avoided thereby preventing breakage of the tape as the tapes are being fed through the machine.

The drive for the machine is obtained through a motor having accurate speed control from a zero speed to the speed of operation of the machine and such motor drives a common pulley wheel from which pulley wheel power is taken to drive the printing platen roller, the first pair of feed rollers, the web cutting roller and the second pair of feed rollers at a speed to assure a feed of one length of flag to one length of tape and wire strip. To assure that slack in the composite strip will be avoided between the heated rollers, the pairs of heated rollers 43 to 48 inclusive are arranged to have slightly increased peripheral speed in the direction of movement of the composite strip, the increase in peripheral speed being accomplished by a slight increase in the diameter of the other pairs of heated feed rollers 45, 46 and 47, 48. The third pair of feed rollers 49 and 50 is provided to have slightly increased peripheral speed and likewise the slitter and the composite strip cut off. But the speed of the slitter will be such that the bridges formed between the tag units will be retained and the effective diameter of the slitting cutter 51 with its notch or notches 53 will be such as to obtain this result.

To avoid rupturing strain on the tape, in starting and to avoid burning of the tape, one way of starting the machine which has been found to be satisfactory is to have the heated rollers cool or at a sufficiently low temperature to avoid any damage to the thermo-plastic tape, the rolls of the heated rollers as well as the third pair of feed rollers are separated a sufficient distance to permit lateral insertion of the tape into the roll passes and after threading such tape and the wire as well as the proper threading of the web, the machine is started from zero speed and electricity is passed into the heating coils of the heated rollers 41, 43 to 48 to heat the rollers to the proper temperature for securing the thermo-plastic together and the heated rollers are moved together by actuation of handle 43s to engage the tape and the motor is started from zero speed. The heat is applied commensurate with the rate of speed of the motor and the resulting peripheral speed of the rollers being arranged to be such as to produce a proper bond of the thermoplastic tape to the flag and wires. The speed is increased until the normal speed of operation of the machine is obtained which has been found to be in excess of 400 pairs of tag units a minute and after the normal operating temperature is obtained the machine may be continued to operate until the rolls of tape are exhausted, at which time the machine may be rethreaded and the operation continued. Because of the horizontal support of the rolls of tape extremely long tapes can be used.

An alternative manner in which the machine may be started is to have the rollers heated to their normal operating temperature and such rollers may be separated by means of the control 43s previously described and the tape and wire made to pass between such rollers and gripped by the composite strip feed rollers 49, 50, suitable guides (not shown) being provided to avoid contact with the segmental cooperating heated roller 41 and the heated roller 43. The separation of the upper heated rollers 43, 45 and 47 from their lower rollers provides a space for the tape which avoids pressure contact between the tape and the rollers thereby reducing danger of objectionable heating or burning of the tapes at low speeds. During the threading operation additional guides may be provided if necessary to keep the tape from destructive contact with the heated rollers under the operating conditions. At this time the first pair of flag web feeding rollers 34, 35 may be separated thereby preventing feeding of the flag web while the wires 25L and 25R and the first and second tapes 21 and 23 will be guided through the passes between the rollers and in between the pair of composite strip feed rollers 49, 50 which are separately controlled by the handle 49d. The machine may be started moving the tapes and the wires through the machine with the resulting composite structure being fed between the slitter and the composite strip cutter until a sufficiently high speed of movement is obtained to avoid adverse affect on the composite strip and when such conditions are obtained the pressure control lever 43s for the pairs of heated rollers is moved to cause the pairs of heated rollers 43 to 48 press against each other thereby sealing the tapes together and at substantially the same time the first pair of feed rollers 34, 35 are caused to feed the web into the web cutter and from there the web of flag material with the partially separated flag will be passed between the second pair of feed rollers 34, 35 through the pass between the segmental roller 40 and first heated roller 41 thereby starting the assembling operation and the assembling operation continues forming finished pairs of tag units in the manner previously described and from that point on the speed of the machine may be increased to the normal operating speed.

It will be apparent that multi-color printing may be obtained by the use of other printing rollers 39 with cooperating doctor rollers and supplies of ink in manners well known, such printing rollers preferably engaging the web while the web is in contact with the printing platen roller 32 to assure accurate registry thereof.

The position of the flag 24F on the strip is determined by the angular relation of the composite strip cut off blade 56 on its shaft by means of set screw adjustment 54g. The position of the printing on the web is determined by the adjustable roll 33 in the bight of the loop of printed web material formed between the printing platen roller 32 and the first pair of feed rollers and such adjustments may be of a nature to be made while the machine is in operation thereby avoiding the necessity of stopping where it is desired to have different locations of the flag on the tape.

The length of the flags 24F may be varied by omitting alternate cutters 36a of the web cutting roller which would produce a tag of twice the length. It will be noted that the second pair of feed rollers 34, 35 are spaced from the segmental roller and its cooperating heated rollers a distance which is greater than the length of a single flag and is less than twice the length of the flag. If flags in excess of twice the length of the usual flag are desired, the second pair of feed rollers are made adjustable by locating them in a different position as explained above so that the space between such second pair of feed rollers and the segmental and the first heated rollers may be increased to provide for greater length of flag.

When the length of the flags is increased, the speed of rotation and the peripheral speed of the first and second pairs of feed rollers and of the cutting roller is increased in proportion to the increased length, this increase in speed being accomplished by the substitution of gears in the gear drive or by any other suitable means which will maintain the time relation of the web cutter and printing with relation to the heated roller and composite strip slitter and cutter.

*Driving Means*

As previously stated, the shaft 39b is a main drive shaft mounted in suitable bearings in the main frame 30 and is driven by a motor and gear unit 39c which is adaptable to have infinite speed adjustments and such motor 39c drives pulley 39e and through belts 39d drives pulley 39f fixed to the main drive shaft 39b. The main drive shaft 39b through gear 39j drives a gear 39k fixed to a first auxiliary power shaft 39a which shaft 39a through a sprocket 39l drives a chain 39m which passes over sprockets 35c, 35c on the first and second pairs of feed rollers thereby positively driving said first and second pair of feed rollers 34 and 35 in timed relation. Another chain 39n interconnects a sprocket 37c on web cut-off anvil roller 37 and a sprocket 35f on the shaft of the lower roller 35 of the first pair of feed rollers thereby positively driving the web cutoff with respect to the web feed rollers. The platen printing roller 32 is driven from a sprocket 35g on shaft 35a by means of a chain 39o which interconnects sprockets 35g and sprocket 32b which drives the platen printing roller 32. It will be noted that the cooperating rollers are driven through suitable gearing previously described.

The main drive shaft 39b has a gear 39g fixed thereon but such gear may be interchanged with gears of different sizes and for such purposes the pulley 39f may be removed and a spacing sleeve thereby permitting replacement of the gear 39g with a gear to obtain the proper speed ratio. The gear 39g meshes with a gear 39h carried by a pivotal arm 39h' which is swingable about a fixed stub shaft 39h'' on which a gear 39i is freely rotatable, such gear 39i meshing with gear 39h and which in turn is driven by gear 39g. The gear 39i serves as the second auxiliary source of power and meshes with a gear 42b which drives the first heated roller 42 and a sprocket 42c on the shaft 42a drives a chain 39p which drives a sprocket 39q which drives the shaft of the lower wire feed roller 25g, the upper roller being driven in timed relation through its gear 25lb which is driven from gear 25gb.

The gear 39i meshes with a gear 44b which meshes with an idler gear 39r which meshes with gear 46b which meshes with another idler gear 39r which meshes with gear 48b which meshes with another idler gear 39r which meshes with gear 50b which meshes with idler gear 39s which meshes with gear 55b which drives the shaft 55a of the anvil roller of the composite strip cutoff. It will be noted that the cooperating gears serve to operate the cooperating rollers of the heated rollers and also of the cutoff and the third pair of feed rollers. The slitter cutter shaft 51a carries a sprocket 51c driven by a chain 39t which is driven from a sprocket 39u fixed to the gear 39s, it being evident that the size of the sprocket 51c determines the speed of rotation and the peripheral speed of the slitter roller 51. It will also be evident that the cooperating anvil roller 52 of the slitter roller is driven in timed relation through gears 51b and 52b.

It will be evident that the length of the tag can be controlled by the diameter of the cutoff roller 54 and such roller can be replaced with a roller of different diameter with substitution of suitable arms 54CL, 54CR and by substitution of corresponding gearing.

It is believed evident that the driving and timed relation of the feed of the flag web material with respect to the feed of the tapes and wires is accomplished in accurately timed relation by the above described gearing and chain drives. It is believed evident that the substitution of one gear 39g for a different gear 39g of a different diameter and a different number of teeth will result in the difference in the relation of l/L thereby providing for a different length of flag with respect to the length of the composite strip.

It will also be evident that when the length of flag is varied that the cooperating cutters 36a will be arranged to give the corresponding length l to the flag.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A machine for printing, assembling, cutting, slitting and separating comprising a frame, a means to support a web of material adjacent the frame, a printing roller adjacent the supply of web material, a first pair of feed rollers for continuing the feed of material, a takeup roller between said printing roller and said first pair of feed rolers for providing a takeup loop, a second pair of feed rollers spaced in the line of feed from said first pair of feed rollers, partial cutoff rollers between said pairs of said feed rollers, means to drive said printing roller, pairs of feed rollers and said partial cutoff rollers in timed relation at substantially the same peripheral speed, a heated roller, a segmental roller cooperating with said heated roller for drawing a partially cut portion forming a flag from the web between the second pair of feed rollers, tape guiding means for guiding a tape to said segmental roller and heated roller, wire feed rollers for drawing and feeding wires, a series of grooved heated rollers for receiving the wires and the cut portion from said web, a slitting roller beyond said heated roller and a cutoff roller beyond said slitting roller, and means to drive said segmental and cooperating heated roller, said wire feed rollers, said heated rollers, said slitting roller and said cutoff roller at substantially the same peripheral speed which peripheral speed is greater than the peripheral speed of said printing roller, said first and second pairs of feed rollers and said partial cutoff roller whereby tapes and wires of greater length than said flags may be assembled, means to apply adhering material to said wires and said web portions forming a flag.

2. The invention according to claim 1 in which the slitting roller is above the line between the passes of the last pair of heated rollers and the cutoff rollers.

3. The invention according to claim 1 in which a third pair of feed rollers is provided between the last pair of feed rollers and the slitting roller to provide feed for the tape and wires to acquire sufficient speed to prevent burning before the heated rollers are engaged with the tapes.

4. The invention according to claim 1 in which the temperature of the heated rollers is controlled by the amount of power applied thereto, said control including thermostats.

5. The invention according to claim 1 in which the tangent of the pass between the cutoff roller and its cooperating anvil may be arranged in angular relation to the tangent of the pass between the heated rollers and the slitter roller to control the shape of the tag unit discharged therefrom.

6. The invention according to claim 1 in which a pair of horizontally disposed disks are mounted on the frame for supporting rolls of tape and guide means are provided to guide tape to the heated rollers in accurate relation, one of said tapes passing over the heated roller adjacent the segmental roller to carry the portion of the web separated by the segmental roller to the other heated roller.

7. The invention according to claim 6 in which supplies of wires are arranged on suitable supports and a wire straightener is positioned on the approach side of the wire feed rollers.

8. The invention according to claim 1 in which the web loop forming roller is eccentrically mounted on the frame and the cutoff roller is angularly adjusted on its shaft whereby the position of a flag and the location of the printing on the flag can be accurately controlled.

9. Apparatus for applying individual flag forming elements to a continuously moving tape without interruption comprising a first pair of feed rollers to feed a web of flag material, a flag web cutter for partially severing the web discharged from the feed rollers into flag elements leaving at least two connecting bridges, said cutter being movable with the web at the same rate to avoid unnecessary strain on the web, a second pair of feed rollers operating at substantially the same rate as said cutter for receiving the partially cut flag elements discharged from said cutter, a tape applying roller adjacent the second pair of feed rollers and a cooperating segmental roller having a portion of its periphery arranged to contact the flag element and press it against said tape applying roller in synchronism with the feed of the flag elements and the tape, said segmental feed roller and said tape applying roller being spaced from said sceond pair of feed rollers a distance greater than the length of one flag element and less than the length of two flag elements and being driven at a substantially faster peripheral speed than said web feeding rollers whereby when a flag element is projected into the bite between said segmental roll and said tape applying roll the leading flag element is severed by rupture of said bridges, the action of said segmental roller and said tape applying roll serving to secure the flag element to said tape.

10. A slitting machine comprising a first shaft, an anvil rotatably mounted on said first shaft, a second shaft rotatably mounted in spaced relation to said first shaft, a hub having a flange and a sleeve fixedly mounted on said second shaft, a circular slitting cutter having an aperture of greater dimension than the external diameter of the sleeve and encircling said sleeve adjacent said flange, a spring carrying cage positioned on said sleeve, a plurality of springs in said cage, a friction washer between said springs and said slitter cutter, and means to adjust the tension in said springs to control the frictional contact of the slitter with said flange, the shafts being closer together than the sum of the radii of the anvil and the cutter and farther apart than the sum of the radius of the anvil and the distance between the periphery of the cutter and the aperture therein.

11. A partial cutoff cutter for web material comprising a platen roller including a shaft, a sleeve fixed to the shaft, a hardened anvil cylinder surrounding said sleeve, resilient insert between said sleeve and said hardened cylindrical anvil to provide for some axial movement of the hardened cylinder relative to the shaft, means to rotatably mount said shaft and means to drive said anvil shaft, a cutter roller cooperating with said anvil roller and having a plurality of cutter receiving slots arranged on its periphery, means to fixedly mount cutters in said slots, a shaft supporting said cutter roller, bearing means for rotatably supporting said shaft, gears interconnecting said cutter roller shaft and said anvil roller shaft to assure constant peripheral speed of both rollers, and means to positively drive said shafts at a fixed and definite rate of speed.

12. The invention according to claim 11 in which the bearing for the shaft includes bearings positioned on the opposite end of the shaft from said gear and means interconnecting such bearings to assure maintaining the shafts in parallel relation.

13. An arrangement for heating comprising a shaft, means to rotatably mount said shaft, an insulating structure on one end of said shaft, a hollow wheel of channel shaped radial section mounted on said insulation for rotation therewith for rollingly contacting work to be heated, a sleeve positioned within said channel, heating elements on the sleeve adjacent the periphery of said wheel, a bracket supporting said sleeve in fixed position and means to secure said bracket to the support for said shaft whereby the wheel may be freely rotatable and will be heated by said heating elements.

14. The invention according to claim 13 in which a rocker arm is mounted on said frame, a second shaft rotatably mounted in said rocker arm and movable toward and away from said first shaft, a second channel shaped wheel insulatedly and fixedly mounted on said second shaft and arranged with its periphery adjacent to the periphery of said first wheel, a second sleeve within the channel of said second wheel, a heating element on said second sleeve for heating the periphery of said second roller and means to support said second sleeve with the heating elements thereon in fixed relation to said rocker arm.

15. The invention according to claim 14 in which means are provided for separating said rollers and means are provided for urging said rollers together.

16. The invention according to claim 13 in which automatic means are provided to control and maintain the wheel at a constant temperature of the proper value to soften thermo-plastic tape to cause the tape to become adherent.

17. A cutoff comprising a first shaft, means to rotatably support said first shaft in a frame, rocker arm means for pivotal movement about said first shaft, a second shaft rotatably mounted in said arm means in spaced relation to said first shaft, a cutter mounted on one of said shafts and an anvil mounted on the other of said shafts, gear means interconnecting said shafts to assure positive driving relation therebetween, means reacting between said frame and said second shaft for causing said second shaft to move about the axis of said first shaft, and means to maintain said second shaft in adjusted position whereby the material passing between said cutter and said anvil may be controlled to direct the material passing therebetween in a desired direction to control the shape of the discharged product.

18. A cutoff comprising a first shaft, means to rotatably support said first shaft in a frame, an arm positioned at each end of said shaft, bearing means between said arms and said first shaft to permit relative rotation therebetween, a second shaft, means to rotatably support said second shaft in said arms in spaced relation to said first shaft, a cutter mounted on said second shaft and an anvil mounted on the said first shaft, gear means interconnecting said shafts to assure positive driving relation therebetween, means reacting between said frame and said second shaft for causing said second shaft to move about the axis of said first shaft, means to maintain said second shaft in adjusted position whereby the space between said cutter and said anvil will be controllable to direct the material passing therebetween in a desired direction to control the shape of the product.

19. Apparatus for applying flags to wires for the purpose of identification comprising means to partially sever a flag from a continuous web of material, means to thereafter completely sever the leading partially severed flag from the adjacent web material, a pair of heated pressing and feeding rollers, means to apply adhesive and carry the flag to the said pair of heated feeding and pressing rollers, means to guide straight wire to the pair of heated rollers whereby the flags are secured to the wires and to the adhesive material, and means to thereafter sever the wire between adjacent flags attached to the wire, whereby a wire tie is provided with an identifying flag thereon.

20. Apparatus for applying flags to wires for the purpose of identification comprising means to print identifying material on a web, means to partially sever a flag from the web, means to thereafter completely sever the leading partially severed flag from the adjacent web material, a pair of pressing and feeding rollers, means to apply adhesive and carry the flag to the said pair of pressing rollers, means to guide straight wire to the pair of pressing rollers whereby the flags are secured to the wire and to the adhesive, and means to thereafter sever the wire between adjacent flags attached to the wire whereby a wire tie is provided with an identifying flag thereon.

References Cited in the file of this patent

UNITED STATES PATENTS

| Number | Name | Date |
|---|---|---|
| 269,753 | Warren | Dec. 26, 1882 |
| 1,340,884 | Freeman | May 25, 1920 |
| 1,565,009 | Howard et al. | Dec. 8, 1925 |
| 1,646,263 | Smedley | Oct. 18, 1927 |
| 2,290,386 | Schindler | July 21, 1942 |
| 2,551,811 | Mueller | May 8, 1951 |
| 2,561,781 | Bruce | July 24, 1951 |
| 2,566,249 | Rainey et al. | Aug. 28, 1951 |
| 2,662,578 | Belcher et al. | Dec. 15, 1953 |
| 2,780,572 | Carlson | Feb. 5, 1957 |
| 2,787,314 | Anderson | Apr. 2, 1957 |